(12) United States Patent
Kudo et al.

(10) Patent No.: US 7,693,995 B2
(45) Date of Patent: Apr. 6, 2010

(54) ARBITRATION APPARATUS FOR ALLOCATING COMPUTER RESOURCE AND ARBITRATION METHOD THEREFOR

(75) Inventors: Yutaka Kudo, Yokohama (JP); Futoshi Haga, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 999 days.

(21) Appl. No.: 11/363,044

(22) Filed: Feb. 28, 2006

(65) Prior Publication Data
US 2007/0106796 A1    May 10, 2007

(30) Foreign Application Priority Data
Nov. 9, 2005    (JP) .............................. 2005-325012

(51) Int. Cl.
*G06F 15/173* (2006.01)
(52) U.S. Cl. ........................ 709/226; 709/223; 709/224; 709/201; 718/104; 718/105
(58) Field of Classification Search ................ 709/226, 709/201, 223–224; 718/104–105
See application file for complete search history.

(56) References Cited

U.S. PATENT DOCUMENTS

| | | | | |
|---|---|---|---|---|
| 4,542,458 A | * | 9/1985 | Kitajima et al. ............. | 718/104 |
| 5,307,496 A | * | 4/1994 | Ichinose et al. ............. | 718/104 |
| 5,787,246 A | * | 7/1998 | Lichtman et al. ............ | 709/220 |
| 5,790,425 A | * | 8/1998 | Wagle ........................ | 709/218 |
| 5,842,021 A | * | 11/1998 | Odani et al. ................ | 717/159 |
| 5,991,793 A | * | 11/1999 | Mukaida et al. ............. | 718/104 |
| 5,996,013 A | * | 11/1999 | Delp et al. .................. | 709/226 |
| 6,259,705 B1 | | 7/2001 | Takahashi et al. | |
| 6,591,290 B1 | * | 7/2003 | Clarisse et al. ............. | 709/205 |
| 6,598,077 B2 | * | 7/2003 | Primak et al. ............... | 709/219 |
| 6,877,158 B1 | * | 4/2005 | Arndt ........................ | 718/104 |
| 6,985,940 B1 | * | 1/2006 | Jenkin ........................ | 709/224 |
| 7,020,161 B1 | * | 3/2006 | Eberle et al. ............... | 370/468 |

(Continued)

FOREIGN PATENT DOCUMENTS

JP    2002183106 A    6/2002

(Continued)

OTHER PUBLICATIONS

Notification of Reasons for Refusal dated May 22, 2009, issued in corresponding Japanese Patent Application No. 2005-325012, including English language translation.

*Primary Examiner*—Alina N. Boutah
(74) *Attorney, Agent, or Firm*—Brundidge & Stanger, P.C.

(57) ABSTRACT

In a business system which allocates a request for one business application to one or more of the computer resources executing such business application, the computer resources are accommodated among the plurality of the business systems so that the load covered by each of the business systems is averaged out. The arbitration apparatus for resource allocation 101 calculates a margin rate for each business system by measuring load for respective business systems, and by calculating a ratio of the measured load and the allowable execution amount allowable under current constitution. When a computer resource 1241 which is not allocated to business system is found, this computer resource is allocated to the business system indicating low margin rate while if such computer resource 1241 is not found, the computer resource 1241 is reallocated by being released from the business system having high margin rate.

12 Claims, 13 Drawing Sheets

METRIC INFORMATION RECORDING TABLE 114

| COMPUTER ID (201) | BUSINESS ID (202) | SERVER KIND (203) | METRIC INFORMATION (204, 210, 205) ||
|---|---|---|---|---|
| | | | THE NUMBER OF REQUESTS (CASES/MINUTE) | CPU UTILIZATION FACTOR (%) |
| M_001 | APP_01 | WEB | 1000 | 90 |
| M_002 | APP_01 | WEB | 1350 | 92 |
| M_005 | APP_02 | WEB | 300 | 58 |
| ⋮ | ⋮ | ⋮ | ⋮ | ⋮ |

221A / 221

U.S. PATENT DOCUMENTS

| | | | |
|---|---|---|---|
| 7,058,947 B1* | 6/2006 | Raja et al. | 718/104 |
| 7,290,259 B2* | 10/2007 | Tanaka et al. | 718/1 |
| 7,315,904 B2* | 1/2008 | Geib et al. | 710/5 |
| 7,376,614 B1* | 5/2008 | Scheinberg et al. | 705/37 |
| 7,433,953 B1* | 10/2008 | Kappler et al. | 709/226 |
| 7,543,020 B2* | 6/2009 | Walker et al. | 709/203 |
| 7,565,656 B2* | 7/2009 | Yamasaki et al. | 718/104 |
| 7,581,224 B2* | 8/2009 | Romero | 718/104 |
| 2002/0087611 A1* | 7/2002 | Tanaka et al. | 709/1 |
| 2002/0124085 A1* | 9/2002 | Matsuda et al. | 709/226 |
| 2003/0079031 A1* | 4/2003 | Nagano | 709/229 |
| 2003/0167329 A1* | 9/2003 | Kurakake et al. | 709/226 |
| 2003/0177417 A1* | 9/2003 | Malhotra et al. | 714/42 |
| 2004/0143664 A1* | 7/2004 | Usa et al. | 709/226 |
| 2004/0205120 A1* | 10/2004 | Dar et al. | 709/203 |
| 2005/0071882 A1* | 3/2005 | Rodriguez et al. | 725/95 |
| 2006/0150191 A1* | 7/2006 | Masuda et al. | 718/105 |
| 2006/0179143 A1* | 8/2006 | Walker et al. | 709/226 |
| 2006/0200545 A1* | 9/2006 | Fromentoux et al. | 709/224 |
| 2009/0019134 A1* | 1/2009 | Bellifemine et al. | 709/218 |

FOREIGN PATENT DOCUMENTS

| | | |
|---|---|---|
| JP | 2002251344 A | 9/2002 |
| JP | 2005-141605 | 6/2005 |
| JP | 2005208767 A | 8/2005 |
| WO | 2004084085 A1 | 9/2004 |
| WO | 2004092971 A1 | 10/2004 |

* cited by examiner

METRIC INFORMATION RECORDING TABLE 114

| COMPUTER ID | BUSINESS ID | SERVER KIND | METRIC INFORMATION ||
|---|---|---|---|---|
| | | | THE NUMBER OF REQUESTS (CASES/MINUTE) | CPU UTILIZATION FACTOR (%) |
| M_001 | APP_01 | WEB | 1000 | 90 |
| M_002 | APP_01 | WEB | 1350 | 92 |
| M_005 | APP_02 | WEB | 300 | 58 |
| ⋮ | ⋮ | ⋮ | ⋮ | ⋮ |

FIG. 5

PROCESSING CAPACITY TABLE 112

| BUSINESS ID | SERVER KIND | SPECIFICATION INFORMATION | | | PROCESSING CAPACITY [CASES/MINUTE] |
| --- | --- | --- | --- | --- | --- |
| | | CPU NAME | CPU FREQUENCY [MHz] | MEMORY [Mbyte] | |
| APP_01 | WEB | AAA | 866 | 1024 | 500 |
| APP_01 | WEB | AAA | 2200 | 1024 | 600 |
| APP_01 | WEB | AAA | 3000 | 1024 | 650 |
| APP_02 | WEB | AAA | 866 | 1024 | 400 |
| APP_02 | WEB | AAA | 2200 | 1024 | 500 |
| ⋮ | ⋮ | ⋮ | ⋮ | ⋮ | ⋮ |
| APP_03 | WEB | AAA | 3000 | 1024 | 1800 |
| ⋮ | ⋮ | ⋮ | ⋮ | ⋮ | ⋮ |

FIG. 6

BUSINESS SYSTEM CONFIGURATION MANAGEMENT TABLE 111

| BUSINESS ID | SERVER KIND | MULTIPLEXING |
| --- | --- | --- |
| APP_01 | LB | POSSIBLE |
| APP_01 | WEB | IMPOSSIBLE |
| APP_01 | DB | POSSIBLE |
| APP_02 | WEB | POSSIBLE |
| APP_02 | DB | POSSIBLE |
| ⋮ | ⋮ | ⋮ |

FIG. 7

RESOURCE MANAGEMENT TABLE 113

| COMPUTER ID | SPECIFICATION INFORMATION ||| BUSINESS ID | SERVER KIND |
|---|---|---|---|---|---|
| | CPU NAME | CPU FREQUENCY [MHz] | MEMORY [Mbyte] | | |
| M_001 | AAA | 2200 | 1024 | APP_01 | WEB |
| M_002 | AAA | 3000 | 1024 | APP_01 | WEB |
| M_003 | AAA | 2200 | 1024 | APP_01 | DB |
| M_004 | AAA | 866 | 1024 | UNALLOCATED | UNALLOCATED |
| ⋮ | ⋮ | ⋮ | ⋮ | ⋮ | ⋮ |
| M_051 | AAA | 3000 | 1024 | APP_03 | WEB |
| M_052 | AAA | 2200 | 1024 | APP_02 | WEB |
| ⋮ | ⋮ | ⋮ | ⋮ | ⋮ | ⋮ |

FIG. 8

BUSINESS MARGIN FACTOR TABLE 115

| BUSINESS ID | SERVER KIND | CURRENT PROCESSING CAPACITY | SUITABLE PROCESSING CAPACITY | MARGIN FACTOR (%) |
|---|---|---|---|---|
| APP_01 | WEB | 1150 | 2350 | 48.9 |
| APP_02 | WEB | 2500 | 2000 | 125.0 |
| APP_03 | WEB | 7800 | 5000 | 200.0 |
| APP_04 | WEB | 4000 | 4000 | 100.0 |
| ⋮ | ⋮ | ⋮ | ⋮ | ⋮ |

FIG. 9

RESOURCE ADJUSTMENT SCHEDULE TABLE 117

| COMPUTER ID 701 | RESERVATION SOURCE SYSTEM 710 | | RESERVATION SOURCE SYSTEM 711 | | ADJUSTMENT DATE AND TIME 706 | REFLECTION FLAG 707 |
|---|---|---|---|---|---|---|
| | BUSINESS ID 702 | SERVER KIND 703 | BUSINESS ID 704 | SERVER KIND 705 | | |
| M_201 | UNALLOCATED | UNALLOCATED | APP_01 | WEB | 2005/3/15/18:00 | COMPLETED |
| M_009 | APP_03 | WEB | APP_01 | WEB | 2005/3/15/18:00 | COMPLETED |
| M_010 | APP_03 | WEB | APP_01 | WEB | 2005/3/15/18:00 | COMPLETED |
| ... | ... | ... | ... | ... | ... | ... |
| M_004 | UNALLOCATED | UNALLOCATED | APP_01 | WEB | 2005/3/15/20:00 | UNCOMPLETED |
| M_051 | APP_03 | WEB | APP_01 | WEB | 2005/3/15/20:00 | UNCOMPLETED |
| ... | ... | ... | ... | ... | ... | ... |

RESOURCE ADJUSTMENT POLICY TABLE 116

| BUSINESS ID | SERVER KIND | DESIRED ORDER | CPU NAME | CPU FREQUENCY [MHz] | MEMORY [Mbyte] | TIME CONDITION [MINUTE] |
|---|---|---|---|---|---|---|
| APP_01 | WEB | 1 | AAA | >=866 | >=512 | 30 |
| APP_02 | WEB | 1 | AAA | >=2200 | >=512 | 30 |
| APP_03 | WEB | 1 | AAA | =2200 | >=512 | 40 |
| APP_03 | WEB | 2 | AAA | =866 | >=512 | 25 |
| ⋮ | ⋮ | ⋮ | ⋮ | ⋮ | ⋮ | ⋮ |

FIG. 11

RESOURCE SET/RELEASE TIME RECORDING TABLE 118

| BUSINESS ID | SERVER KIND | SPECIFICATION INFORMATION | | | SET TIME [MINUTE] | RELEASE TIME [MINUTE] |
| | | CPU NAME | CPU FREQUENCY [MHz] | MEMORY [Mbyte] | | |
|---|---|---|---|---|---|---|
| APP_01 | WEB | AAA | 866 | 1024 | 4 | 2 |
| APP_01 | WEB | AAA | 2200 | 1024 | 3 | 1 |
| APP_01 | WEB | AAA | 3000 | 1024 | 2 | 1 |
| APP_02 | WEB | AAA | 866 | 1024 | 12 | 10 |
| APP_02 | WEB | AAA | 2200 | 1024 | 10 | 8 |
| ⋮ | ⋮ | ⋮ | ⋮ | ⋮ | ⋮ | ⋮ |
| APP_03 | WEB | AAA | 3000 | 1024 | 10 | 8 |
| ⋮ | ⋮ | ⋮ | ⋮ | ⋮ | ⋮ | ⋮ |

FIG. 17

BUSINESS MARGIN FACTOR TABLE 115

115A

| BUSINESS ID | SERVER KIND | CURRENT PROCESSING CAPACITY | SUITABLE PROCESSING CAPACITY | MARGIN FACTOR (%) |
|---|---|---|---|---|
| APP_01 | WEB | 1150 | 2350 | 48.9 |
| APP_02 | WEB | 2500 | 2000 | 125.0 |
| APP_03 | WEB | 7800 | 5000 | 200.0 |
| APP_04 | WEB | 4000 | 4000 | 100.0 |
| ⋮ | ⋮ | ⋮ | ⋮ | ⋮ |

115B

| BUSINESS ID | SERVER KIND | CURRENT PROCESSING CAPACITY | SUITABLE PROCESSING CAPACITY | MARGIN FACTOR (%) |
|---|---|---|---|---|
| APP_01 | WEB | 1650 | 2350 | 70.2 |
| APP_02 | WEB | 2500 | 2000 | 125.0 |
| APP_03 | WEB | 7800 | 5000 | 200.0 |
| APP_04 | WEB | 4000 | 4000 | 100.0 |
| ⋮ | ⋮ | ⋮ | ⋮ | ⋮ |

115C

| BUSINESS ID | SERVER KIND | CURRENT PROCESSING CAPACITY | SUITABLE PROCESSING CAPACITY | MARGIN FACTOR (%) |
|---|---|---|---|---|
| APP_01 | WEB | 2300 | 2350 | 97.9 |
| APP_02 | WEB | 2500 | 2000 | 125.0 |
| APP_03 | WEB | 7800 | 5000 | 120.0 |
| APP_04 | WEB | 4000 | 4000 | 100.0 |
| ⋮ | ⋮ | ⋮ | ⋮ | ⋮ |

ARBITRATION APPARATUS FOR ALLOCATING COMPUTER RESOURCE AND ARBITRATION METHOD THEREFOR

CLAIM OF PRIORITY

The present application claims priority from Japanese application P2005-325012 filed on Nov. 9, 2005, the content of which is hereby incorporated by reference into this application.

BACKGROUND OF THE INVENTION

The present invention relates to a technology for determining a computer to be allocated to a desired business application among plurality of the computers.

In recent years, use of the Internet in processing predetermined application has been widely performed. Specifically, business applications were conventionally used only in a system whose number of operation terminals was fixed. However, in light of the growing number of processes performed using the Internet, estimation of the number of operation terminals and the number of requests is becoming difficult.

For this reason, there is suggested a technology which improves operation stability and enhances responsiveness to requests by increasing, in accordance with the number of requests, amount of resources (i.e., number of computers) for executing business applications, thereby distributing the load. For example, in Japanese Patent Laid-Open No. 2005-141605 (US Publication No. 20050102674) (hereinafter, referred to as Patent Document 1), a technology is suggested in which a computer resource executing a certain service (business application) is reallocated to another service. In this technology, standby computer resources are kept in a "dead stand by" state where application is at least not installed and by sharing such dead standby state computer resources among plurality of services or users, an improvement in usage rate of idle computer resources and server integration are to be accomplished, thereby reducing the cost required for maintaining computer resources. Moreover, concerning respective services, load estimation is conducted using operation history of the past while idle computer resources secured and kept by these services are directed to other services according to result of the load estimation.

In large-scale computing centers, there is configured a system which executes each one of a plurality of business applications (for instance, Web service program) by at least one of a plurality of computers while directs request for the business application to the computer executing such business application. In such systems, a computer non-allocated with business application is pooled, the pooled non-allocated computer is then allocated to business applications having large number of processing steps, and hence the resource amount (that is, number of computers) for the business application having large processing steps is increased due to execution of such business application being performed by the allocated computer. According to such procedure, service level for the business application having large processing steps is prevented from degrading. Here, the service level refers to a level of service provided to service users by service providers. For example, the service level can be represented by a time required from transmission of the request in a user terminal of the service user until the result of the request is returned to the same user terminal.

According to technology described in the Patent Document 1 above mentioned, when a free resource is not found in a shared resource pool, surplus computer resources of the low load business application can be reallocated to the high load business application, in the case of above-described system.

However, the technology described in Patent Document 1 does not consider the following points.

(1) The computer resources used in the computing center do not necessarily share the same specification.

(2) The number of requests acceptable (that is, to stably process) for a computer resource having certain specification differs with the business application.

For this reason, when the technology described in above mentioned patent document 1 is applied to allocation of computer resources for each of the business applications in a system which executes each one of a plurality of business applications by at least one of a plurality of computers while directs request for the business application to the computer executing such business application, an effective allocation of computer resources becomes difficult, that is, free from scarce computer resources or occurrence of over-allocation of the computer resources prevented.

SUMMARY OF THE INVENTION

The present invention made in view of above described problems, has an object to average out a load applied to respective business systems by accommodating computer resources among plurality of business systems that direct request for business application to a computer resource executing the same business application.

In order to solve the aforementioned problem, the present invention offers calculation of a margin rate indicative of ratio between an actual processing amount required to process subject business application and an allowable processing amount representing processing amount available by the computing resources allocated to the business application, for each of the business systems.

Then, at least one computer resource allocated to a business system whose margin rate indicates a prescribed level or more, or in other words, a business system having surplus computer resources, is reallocated to a business system whose margin rate shows below the prescribed level, or in other words, a business system with insufficient computer resources. Alternatively, a computer resource allocated to a business system showing highest margin rate is reallocated to a business system showing lowest margin rate so as to render marginal rate inequities among business systems to satisfy a predetermined condition.

For example, in the first aspect of the present invention, there is provided An arbitration apparatus for modifying allocation of computer resource for executing business application in a system, the apparatus comprises: processing capacity storing means which stores an expected processing capacity expected when the business application is executed by computer resources according to individual spec of the computer resources, for each of the business application; processing amount storing means which stores the processing amount of the business application allocated to each of the computer resources, for each of the computer resources; margin index calculating means which calculates the margin index based on ratio of a current processing amount representing sum of processing amount of the business application by each of the computer resources allocated with the business application and an optimum processing amount representing sum of processing capacity for the business application of each of the computer resources allocated with the business application; adjustment planning means which plans a change of the business application to be allocated to the computer resources based on the margin rate for each of the business applications calculated by the margin index calculating means; and configuration modifying means which releases the business application allocated to the computer resource according to planned content determined by the adjustment planning means and setting another business application to the computer resource; wherein the system executes each one of a plurality of business applications by at least one of a plurality of computing resources and directing a request for business application to the computer resource executing the business application, and wherein the margin index calculating means calculates the optimum processing amount by: calculating the current processing amount for the business application being specified, for each of the computer resources allocated with the business application, using the processing amount storing means; and adding the processing capacity for the business application being specified, for each of the computer resources, based on respective specification of the computer resources allocated with the business application, using the processing capacity storing means, to calculates optimum processing capacity.

According to the present invention, even when various kinds of specifications of computer resources exist, or even when a computer resource which is not allocated to any business applications, in other words, a free resource does not exist, it is possible to accommodate the computer resources among a plurality of business systems, thereby averaging load of the individual business systems.

BRIEF DESCRIPTION OF THE DRAWINGS

FIG. 5 is a diagram schematically showing a processing capacity table 112;

FIG. 6 is a diagram schematically showing a business system configuration management table 111;

FIG. 7 is a diagram schematically showing a resource management table 113;

FIG. 8 is a diagram schematically showing a business margin index management table 115;

FIG. 9 is a diagram schematically showing a resource adjustment planning table 117;

FIG. 10 is a diagram schematically showing a resource adjustment policy table 116;

FIG. 11 is a diagram schematically showing a resource set/release time recording table 118;

FIG. 17 is a diagram illustrating the transition of the business margin index table 115.

DESCRIPTION OF THE PREFERRED EMBODIMENTS

Hereinafter, an embodiment of the present invention will be described.

Figure 1:
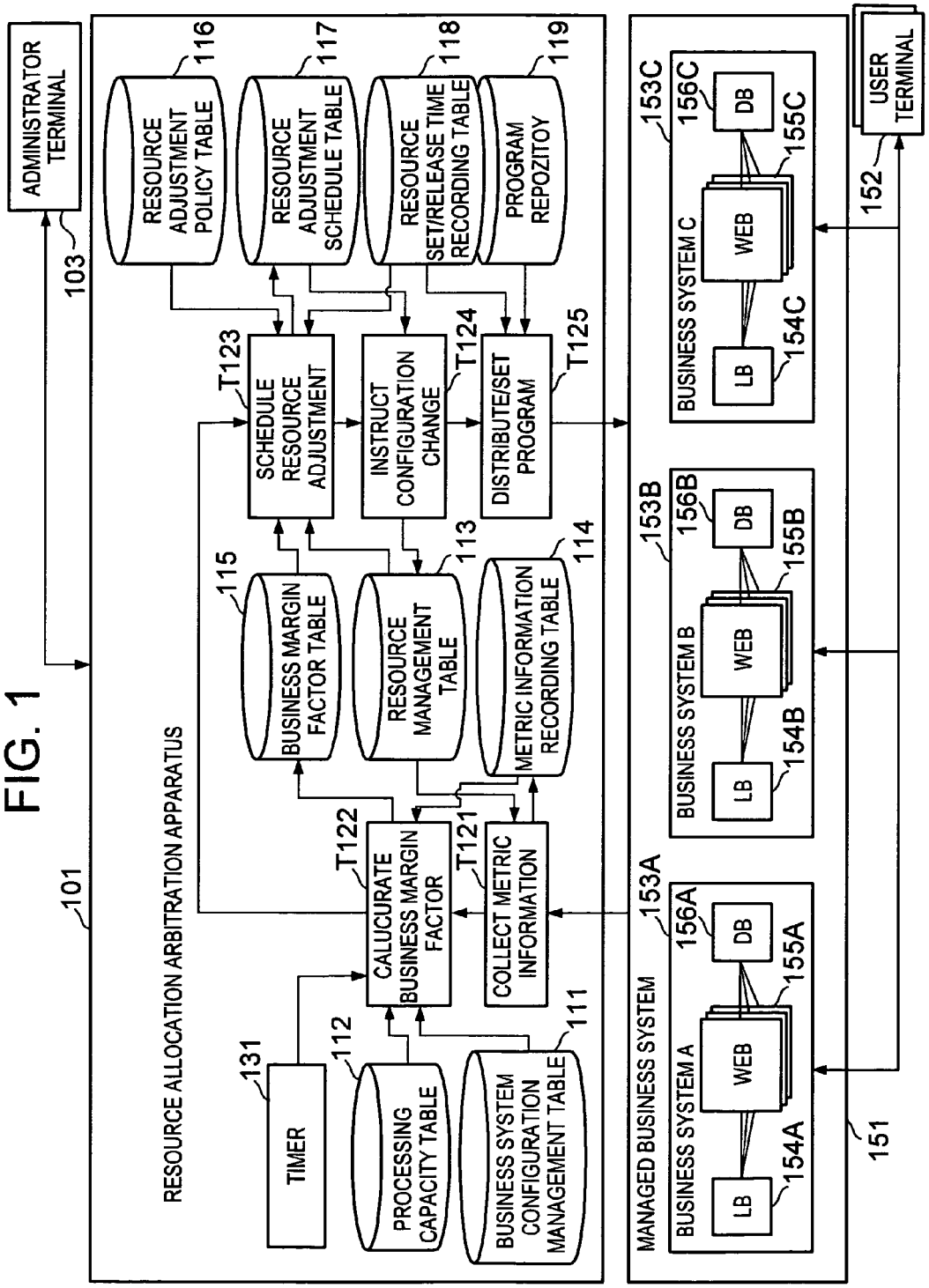
FIG. 1 is a diagram illustrating outline of an operation of a resource allocation arbitration system, to which an embodiment of the present invention is applied.

FIG. 1 is a diagram illustrating the outline of an operation of a resource allocation arbitration system, to which an embodiment of the present invention is applied. As shown in FIG. 1, the resource allocation arbitration system of this embodiment has a arbitration apparatus for resource allocation 101, an administrator terminal 103 which operates the arbitration apparatus for resource allocation 101, a managed business system 151, and at least one user terminal 152 that uses the managed business system 151.

The managed business system 151 has a plurality of business systems 153A to 153C (hereinafter, simply referred to as business system 153). The business system 153 executes a business application according to instructions from the user terminal 152, and transmits the result to the user terminal 152. The business systems 153A to 153C correspondingly have load balancers 154A to 154C (hereinafter, simply referred to as load balancer 154), Web servers 155A to 155C (hereinafter, simply referred to as Web server 155), and database servers 156A to 156C (hereinafter, simply referred to as database server 156), which are controlled by the arbitration apparatus for resource allocation 101. Moreover, information regarding the server and each of the business systems 153 constituted by the server is registered in a business system configuration management table 111 of the arbitration apparatus for resource allocation 101 described below.

By the way, the arbitration apparatus for resource allocation 101 collects metric information, such as the number of requests from each of the business systems 153, a CPU utilization rate, and the like. And then, by using a resource management table 113 which manages business applications allocated to individual computer resources, the arbitration apparatus for resource allocation 101 records the collected metric information in a metric information recording table 114 in association with the business application allocated to a computer resource as a collection destination (T121).

Next, if execution timing is notified by a timer 131, if an event is notified from any one of the business systems 153, or if an instruction from the administrator terminal 103 is notified, by using a processing capacity table 112, the business system configuration management table 111, and the metric information recording table 114, for each business system 153, the arbitration apparatus for resource allocation 101 calculates a ratio between current processing capacity and optimum processing capacity as a margin index. The current processing capacity is a processing amount of the business application to be provided by the business system 153, and the optimum processing capacity is a processing amount of the business application requested by the business system 153. And then, the arbitration apparatus for resource allocation 101 records the result in a business margin index table 115 (T122). Here, in the processing capacity table 112, as regards each business system, for each of the specifications of the computer resources, processing capacity which is a processing amount to be stably achieved when the computer resource having the specification executes the business application is registered. Further, in the business system configuration management table 111, as regards each of the business systems, for each kind of computer resource, information indicating whether or not the kind of computer resource can be multiplexed and allocated to the business application is registered.

Next, by using the business margin index table 115, a resource adjustment policy table 116, a resource set/release time recording table 118, and the resource management table 113, the arbitration apparatus for resource allocation 101 determines which one of the business systems 153A to 153C should the computer resource be reallocated to which one of the business systems 153A to 153C, and records the determination content in a resource adjustment planning table 117 (T123). Here, in the resource adjustment policy table 116, for each business system, a condition of the computer resource to be reallocated to the business system is registered. Further, in the resource set/release time recording table 118, as regards each business system, for each of the specifications of the computer resources, time until the business application is set (installed) from the computer resource such that the business application can be used, and time until the business application is released (uninstalled) such that another business application can be ready to be set are registered.

Next, the arbitration apparatus for resource allocation 101 determines a computer resource, which changes an executed business application, according to the adjustment plan recorded in the resource adjustment planning table 117, and updates the resource management table 113 according to the determination content (T124). And then, the arbitration apparatus for resource allocation 101 reads out the business application of the business system, which newly allocates the computer resource, from a program repository 119, in which the business applications to be executed by the individual business systems are registered, and distributes the business application to the computer resource (the computer resource which changes the executed business application) (T125). Upon receiving the business application, the computer resource releases (uninstalls) the business application under execution, and sets (installs) and executes the business application distributed by the arbitration apparatus for resource allocation 101.

Figure 2:
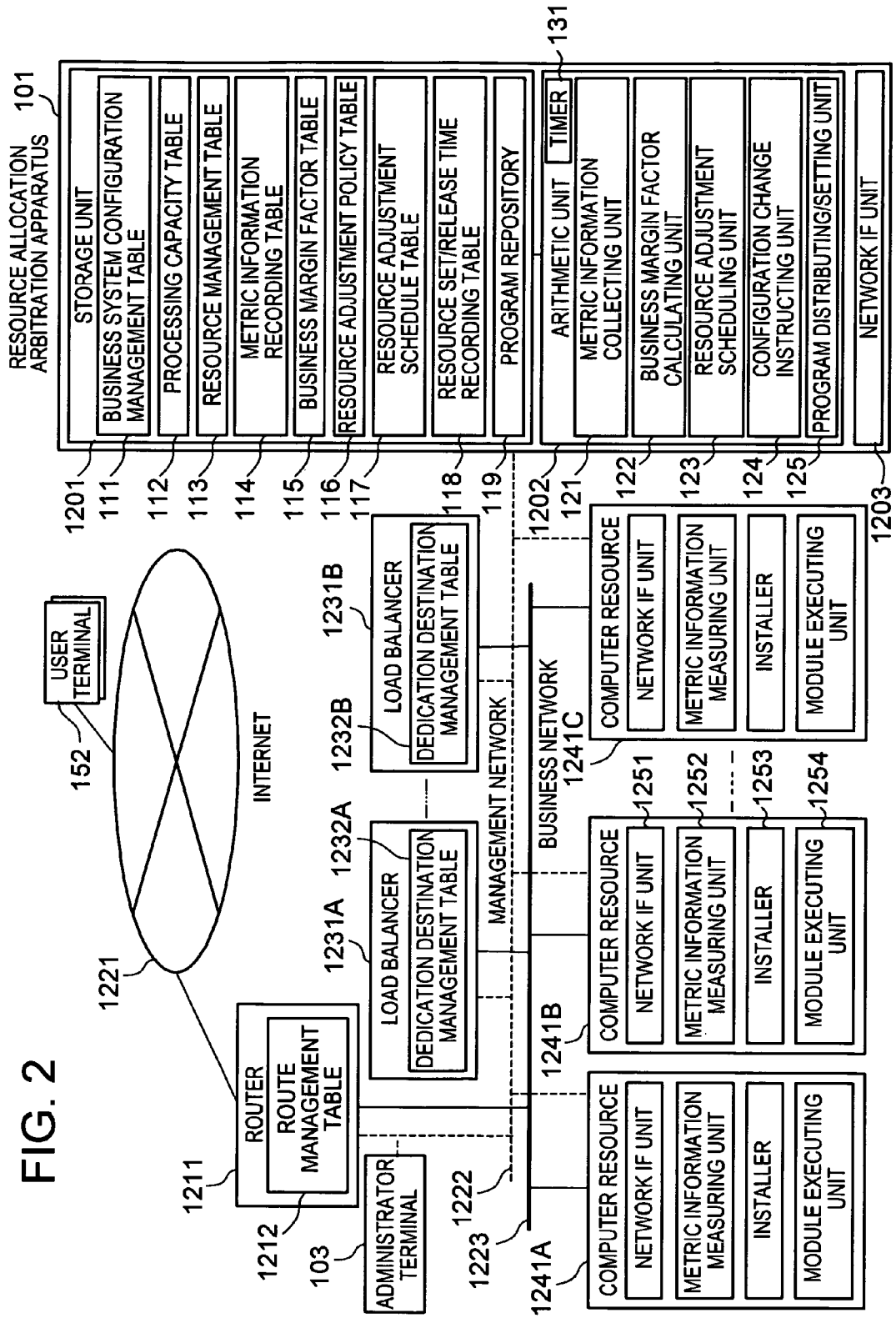
FIG. 2 is a schematic view of the resource allocation arbitration system, to which an embodiment of the present invention is applied.

FIG. 2 is a schematic view showing the resource allocation arbitration system shown in FIG. 1. As shown in FIG. 2, the resource allocation arbitration system of this embodiment has the arbitration apparatus for resource allocation 101, a plurality of load balancers 1231A to 1231B (hereinafter, simply referred to as load balancer 1231), a plurality of computer resources 1241A to 1241C (hereinafter, simply referred to as computer resource 1241), a router 1211 which is connected to Internet 1221, the administrator terminal 103, and the user terminal 152. Moreover, the computer resources 1241 serving as Web servers correspond to the Web servers 155 shown in FIG. 1. Further, the computer resources 1241 serving as database servers correspond to the database servers 156 shown in FIG. 1.

The arbitration apparatus for resource allocation 101, the load balancers 1231, the computer resources 1241, and the router 1211 are connected to one another through a business network 1223 and a management network 1222.

The business network 1223 is a network which is used when the computer resources 1241 supply a service by the business application to the user terminal 152 connected to Internet 1221. Further, the management network 1222 is a network which is used when the arbitration apparatus for resource allocation 101 maintains and manages the load balancers 1231, the computer resources 1241, and the router 1211. To the management network 1222, the administrator terminal 103 which is used to maintain and manage the load balancers 1231, the computer resources 1241, and the router 1211 is connected. Moreover, the business network 1223 and the management network 1222 may be constructed to be physically different from each other by using separate cables or may be constructed to be logically different from each other on the same cable.

The router 1211 has a routing management table 1212 which stores the correspondence between a global IP address and a local IP address for each of the load balancers 1231. The router 1211 transmits a request received from the user terminal 152 through Internet to the load balancer 1231 having the local IP address corresponding to the global IP address assigned as the transmission destination of the request according to the routing management table 1212. Further, the router 1211 transmits the processing result of the request received from the load balancer 1231 to the user terminal 152 as the transmission source of the request through Internet 1221. Other functions of the router 1211 are the same as those of the existing router, and the detailed descriptions thereof will be omitted.

The load balancer 1231 forms the business system 153, which is a business application load distribution (horizontal scaling) system, in cooperation with at least one computer resource 1241 through the business network 1223. The load balancer 1231 has a dedication destination management table 1232 in which information of connectable computer resources 1241 is registered. And then, the load balancer 1231 transmits the request transmitted from the router 1211 to any one computer resource 1241 of the computer resources 1241 registered in the dedication destination management table 1232 through the business network 1223 so as for the computer resource 1241 to process the request. Further, the load balancer 1231 receives the processing result of the request from each of the computer resources 1241 registered in the dedication destination management table 1232 through the business network 1223, and returns the processing result to the transmission source of the request through the router 1211. Further, the load balancer 1231 updates the dedication destination management table 1232 according to the instruction from the arbitration apparatus for resource allocation 101 through the management network 1222. Other functions of the load balancer 1231 are the same as those of the load balancer used in the existing load distribution system, and the detailed descriptions thereof will be omitted.

The computer resource 1241 processes the request received through the business network 1223 according to the business application under execution, and transmits the result to the load balancer 1231, which forms the business system 153 in cooperation with the computer resource 1241, or other computer resources 1241. Further, the computer resource 1241 controls the execution of the business application according to the instruction received from the arbitration apparatus for resource allocation 101 through the management network 1222.

As shown in FIG. 2, each of the computer resources 1241 has a network IF (interface) unit 1251 which connects the business network 1223 and the management network 1222 to each other, a metric information measuring unit 1252, an installer 1253, and a module executing unit 1254.

The metric information measuring unit 1252 measures the metric information of the computer resource 1241, and transmits the metric information to the arbitration apparatus for resource allocation 101 through the management network 1222. In this embodiment, as the metric information, the number of requests received from the business network 1223 per unit time is measured. And then, the metric information measuring unit 1252 transmits the measured metric information to the arbitration apparatus for resource allocation 101 through the management network 1222, together with a computer ID, which is identification information (for example, local address) of the computer resource 1241.

The installer 1253 installs program files (program of business application) assigned by the arbitration apparatus for resource allocation 101 according to the instruction received from the arbitration apparatus for resource allocation 101 through the management network 1222, and executes the program on the module executing unit 1254. Further, the installer 1253 stops the business application under execution on the module executing unit 1254, and uninstalls the business application.

The module executing unit 1254 processes the request received through the business network 1223 according to the business application under execution, and transmits the result to the load balancer 1231, which forms the business system 153 in cooperation with the computer resource 1241, or other computer resources 1241 through the business network 1223.

Other functions of the computer resource 1241 are the same as those of the computer resource used in the existing load distribution system, and the detailed descriptions thereof will be omitted. Moreover, in this embodiment, all the computer resources 1241 do not necessarily have the same specification.

The arbitration apparatus for resource allocation 101 has a network IF unit 1203, through which the arbitration apparatus for resource allocation 101 is connected to the management network 1222, an arithmetic unit 1202, and a storage unit 1201.

The storage unit 1201 has the business system configuration management table 111, the processing capacity table 112, the resource management table 113, the metric information recording table 114, the business margin index table 115, the resource adjustment policy table 116, the resource adjustment planning table 117, the resource set/release time recording table 118, and the program repository 119. The descriptions of the individual tables 111 to 119 will be described below.

The arithmetic unit 1202 has a metric information collecting unit 121, a business margin index calculating unit 122, a resource adjustment scheduling unit 123, a configuration change instructing unit 124, a program distributing/setting unit 125, and the timer 131. The individual processing units 121 to 125 will be described below.

Figures 3, 4:
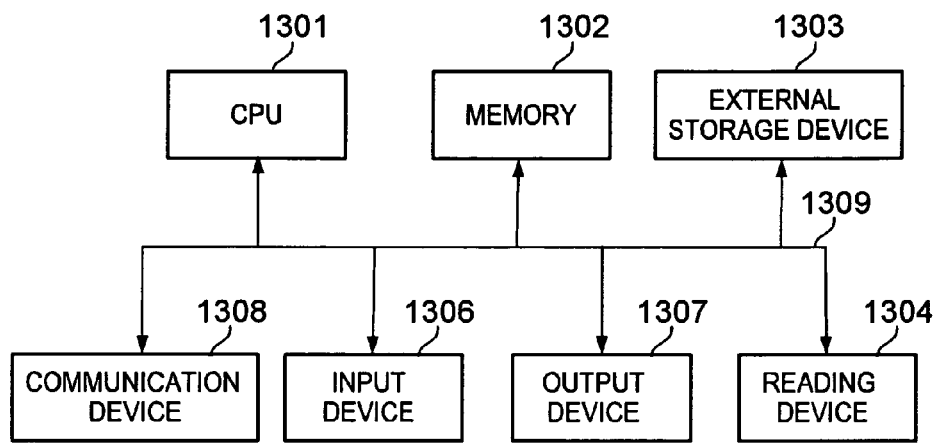
FIG. 3 is a diagram showing an example of a hardware configuration of a arbitration apparatus for resource allocation 101.
FIG. 4 is a diagram schematically showing a metric information recording table 114.

FIG. 3 is a diagram showing an example of the hardware configuration of the arbitration apparatus for resource allocation 101. As shown in FIG. 3, in a general-use computer having a CPU 1301, a memory 1302, an external storage device 1303, such as the HDD or the like, a reading device 1304 which reads data from a recording medium, such as the CD-ROM, DVD-ROM, or IC card, an input device 1306, such as a keyboard or a mouse, an output device 1307, such as a monitor or a printer, a communication device 1308 for the connection to the management network 1222, and a bus 1309 for connects these devices to one another, the arbitration apparatus for resource allocation 101 of this embodiment can be implemented by causing the CPU 1301 to execute a program loaded on the memory 1302. The program may be downloaded to the external storage device 1303 from the recording medium through the reading device 1304 or from the management network 1222 through the communication device 1308, and then may be loaded on the memory 1302 to be executed by the CPU 1301. Alternatively, the program may be directly loaded on the memory 1302, without passing through the external storage device 1303, to be executed by the CPU 1301. Moreover, in this case, as the storage unit 1201, the memory 1302, the external storage device 1303, or the recording medium mounted on the reading device 1304 can be used. Further, as the network IF unit 1203, the communication device 1308 can be used.

Next, the individual tables 111 to 119 provided in the storage unit 1201 will be described.

The metric information recording table 114 is a table which accumulates the measurement result (metric information) of load of each of the computer resources 1241 constituting the business system 153. FIG. 4 is a diagram schematically showing the metric information recording table 114. As shown in FIG. 4, in the metric information recording table 114, a record 221 is registered for each computer resource 1241. The record 221 has a field 201 for registering the computer ID of the target computer resource 1241, a field 202 for registering a business ID for identifying the business system 153 to which the computer resource 1241 belongs, a field 203 for registering a server kind indicating the kind of the computer resource 1241 (the Web server 155 or the database server 156), and a field 210 for registering the metric information measured by the computer resource 1241. In this embodiment, as the metric information, the number of requests 204 per unit time and the CPU utilization rate 205 are used.

For example, the record 221A indicates that the computer resource 1241 having the computer ID 'M_001' belongs to the business system having the business ID 'APP_01', the server kind thereof is 'WEB', and, the measured values of the metric information are the number of requests '1000 (cases/minute)' and the CPU utilization rate '90 (%)'.

The processing capacity table 112 is a table which, as regards each of the server kinds of the individual business systems 153, for each of the specifications of the computer resources 1241, records processing capacity when the computer resource 1241 having the specification operates the business application corresponding to the server kind of the business system 153. FIG. 5 is a diagram schematically showing the processing capacity table 112. As shown in FIG. 5, in the processing capacity table 112, a record 321 is registered for each combination of the server kind of the business system 153 and the specification of the computer resource 1241. The record 321 has a field 301 for registering the business ID of the target business system, a field 302 for registering the server kind, a field 310 for registering specification information, and a field 306 for registering processing capacity.

Moreover, in this embodiment, as the specification information, a CPU name 303, a CPU frequency 304, and a memory space 305 are used. Further, in this embodiment, when the computer resource 1241 having the specification information registered in the field 310 operates the business application corresponding to the business ID and the server kind registered in the fields 301 and 302, respectively, a limit value of the number of requests to be stably operated, that is, a value obtained by measuring the number of requests to be permitted by one computer resource 1241 through a performance test or the like in advance, is stored as the processing capacity. Even though the computer resources 1241 haves the same specification, the processing capacity is different according to the operated business applications. Accordingly, the processing capacity is stored in the processing capacity table 112 for each combination of the server kind of each business system 153 and the specification of the computer resource 1241.

For example, the record 321A indicates that, when the computer resource 1241 having the CPU name 'AAA', the CPU frequency '866 MHz', and the memory space '1024

Mbyte' operates the business application corresponding to the server kind 'WEB' in the business system 153 having the business ID 'APP_01', the processing capacity is '500 (cases/minute)'.

The business system configuration management table 111 is a table which registers information indicating whether or not the server can be multiplexed for each of the server kinds of the business systems. FIG. 6 is a diagram schematically showing the business system configuration management table 111. As shown in FIG. 6, in the business system configuration management table 111, a record 421 is registered for each combination of the server kind to the business system. The record 421 has a field 401 for registering the business ID of the target business system, a field 402 for registering the server kind, and a field 403 for registering the information indicating whether or not the server can be multiplexed, that is, information indicating whether or not the computer resources 1241 of the server kind can be executed in parallel.

For example, the record 421A indicates that, for the business system 153 having the business ID 'APP_01', the server of the server kind 'LB' (load balancer) can be multiplexed. Further, the record 421B indicates that, for the business system 153 having the business ID 'APP_01', the server of the server kind 'WEB' (Web server) cannot be multiplexed. Further, the record 421C indicates that, for the business system 153 having the business ID 'APP_01', the server of the server kind 'DB' (database server) can be multiplexed. Moreover, in this embodiment, only the server kind of the business system, which can be multiplexed, is subjected to a resource allocation arbitration processing.

The resource management table 113 is a table which, for all the computer resources 1241 to be managed by the arbitration apparatus for resource allocation 101, registers the specification information and allocation information to the business systems 153. FIG. 7 is a diagram schematically showing the resource management table 113. As shown in FIG. 7, in the resource management table 113, a record 521 is recorded for each computer resource 1241. The record 521 has a field 501 for registering the computer ID of the computer resource 1241, a field 510 for registering the specification information (a CPU name 502, a CPU frequency 503, and a memory space 504), a field 505 for registering the business ID of the business system 153 allocated to the computer resource 1241, and a field 506 for registering the server kind in the business system 153 of the computer resource 1241. In the fields 505 and 506 of the record 521 of the pooled computer resource 1241, 'UNALLOCATED' indicating that the computer resource 1241 is not allocated yet is registered.

For example, the record 521A indicates that the computer resource 1241 having the computer ID 'M_001' has the specification of the CPU name 'AAA', the CPU frequency '2200 MHz', and the memory space '1024 Mbyte', and is allocated as the server kind 'WEB' of the business system 153 having the business ID 'APP_01'. The record 521B indicates that the computer resource 1241 having the computer ID 'M_003' has the specification of the CPU name 'AAA', the CPU frequency '2200 MHz', and the memory space '1024 Mbyte', and is allocated as the server kind 'DB' of the business system 153 having the business ID 'APP_01'. Further, the record 521C indicates that the computer resource 1241 having the computer ID 'M_004' has the specification of the CPU name 'AAA', the CPU frequency '866 MHz', and the memory space '1024 Mbyte', and is not allocated to the business system 153.

The business margin index table 115 is a table which stores information required to determine a reallocation method of the computer resource 1241 among the business system 153 (to move the computer resource 1241 from which business system 153 to which business system 153) FIG. 8 is a diagram schematically showing the business margin index table 115. As shown in FIG. 8, in the business margin index table 115, a record 621 is registered for each server kind on each of the business systems 153. The record 621 has a field 601 for registering the business ID of the business system 153, a field 602 for registering the server kind, a field 603 for registering the current processing capacity which is the sum of the processing capacity of the individual computer resources 1241 allocated to the server kind in the business system 153, a field 604 for registering the optimum processing capacity requested for the computer resource 1241 of the server kind in the business system 153, and a field 605 for registering the margin index calculated from the ratio of the current processing capacity to the optimum processing capacity ((current processing capacity/optimum processing capacity)×100).

For example, the record 621A indicates that, in the business system 153 having the business ID 'APP_01', the computer resource 1241 of the server kind 'WEB' has the current processing capacity '1150' and the optimum processing capacity '2350', and then the margin index is '48.9'. When the margin index is lower than 100, a larger number of requests than the requests to be stably processed are being processed, and thus load of the business system 153 is high (no margin). In contrast, when the margin index is 100 or more, the requests smaller than the limit value of the number of requests to be stably processed are being processed, and thus load of the business system 153 is low (has a margin).

The resource adjustment planning table 117 is a table for registering information indicating that which computer resource 1241 of which business system 153 is reallocated as a server of which server kind of which business system 153. FIG. 9 is a diagram schematically showing the resource adjustment planning table 117. As shown in FIG. 9, in the resource adjustment planning table 117, a record 721 is registered for each computer resource 1241. The record 721 has a field 701 for registering the computer ID of the computer resource 1241, a field 710 for registering information of a reservation source system which is the business system 153 of a reservation source of the computer resource 1241, a field 711 for registering information of a reservation destination system which is the business system 153 of a reservation destination of the computer resource 1241, a field 706 for registering date and time at which a reservation change is scheduled (adjustment date and time), and a field 707 for registering a reflection flag. Moreover, in this embodiment, the reservation source system information has the business ID 702 of the business system 153 of the reservation source and the server kind 703 of the computer resource 1241 in the business system 153. Further, the reservation destination system information has the business ID 704 of the business system 153 of the reservation destination and the server kind 705 of the computer resource 1241 in the business system 153. The reflection flag indicates whether or not the content of the record 721 is reflected in the resource management table 113.

For example, the record 721A indicates that a schedule for reallocating the computer resource 1241 of the computer ID 'M_009' allocated to the server kind 'WEB' in the business system 153 having the business ID 'APP_03' to the server kind 'WEB' in the business system 153 having the business ID 'APP_01' is scheduled on the adjustment date and time '2005/3/15/18:00', the schedule is already executed, and the content thereof is reflected in the resource management table 113.

The resource adjustment policy table 116 is a table which stores desired conditions (specification and provision time) of the computer resource 1241 to be added to the business system 153. FIG. 10 is a diagram schematically showing the resource adjustment policy table 116. As shown in FIG. 10, in the resource adjustment policy table 116, a record 921 is registered for each combination of the business system, the server kind, and a desired order of the computer resource. The record 921 has a field 901 for registering the business ID of the business system 153, a field 902 for registering the server kind, a field 903 for registering the desired order, fields 904 to 906 for registering the conditions of the CPU name and the CPU frequency and the condition of the memory space of the computer resource 1241 to be added, and a field 907 for registering the condition of the provision time of the computer resource 1241. In this embodiment, for the same combination of the business system and the server kind, a plurality of desired conditions of the computer resource 1241 can be assigned. In this case, the desired order is registered in the field 903. As the condition of the provision time, an upper limit of time to be permitted as time for adding the computer resource 1241 is assigned. The condition of the CPU frequency and the condition of the memory space are assigned by using operators, such as '=' '<', '>', '>=', or '<='.

For example, the record 921A indicates that the computer resource 1241 having the desired order 'FIRST' allocated to the server kind 'WEB' of the business system 153 having the business ID 'APP_01' has the CPU name 'AAA', the CPU frequency '866 MHz or more', and the memory space '512 Mbyte or more', and the upper limit of the provision time of the computer resource 1241 is '30 minutes'.

The resource set/release time recording table 118 is a table which registers time until the business application is set (installed) in the computer resource 1241 such that the business application can be used, and time until the business application is released (uninstalled) from the computer resource 1241 such that another business application can be ready to be set. FIG. 11 is a diagram schematically showing the resource set/release time recording table 118. As shown in FIG. 11, in the resource set/release time recording table 118, a record 1021 is registered for each combination of the business system, the server kind, and the specification of the computer resource. The record 1021 has a field 1001 for registering the business ID of the business system 153, a field 1002 for registering the server kind, a field 1010 for registering the specification information of the computer resource 1241, a field 1006 for registering set time required to set the business application corresponding to the server kind of the business system 153 in the computer resource 1241, and a field 1007 for registering release time required to release the business application corresponding to the server kind of the business system 153 from the computer resource 1241. In this embodiment, the specification information has a CPU name 1003, a CPU frequency 1004, and a memory space 1005.

For example, the record 1021A indicates that, when the computer resource 1241 of the CPU name 'AAA', the CPU frequency '866 MHz', and the memory space '1024 Mbyte' is used for the server kind 'WEB' of the business system 153 of the business ID 'APP_01', the set time required to set the business application corresponding to the server kind of the business system 153 in the computer resource 1241 is 'four minutes', and the release time required to release the business application from the computer resource 1241 is 'two minutes'.

Figure 12:
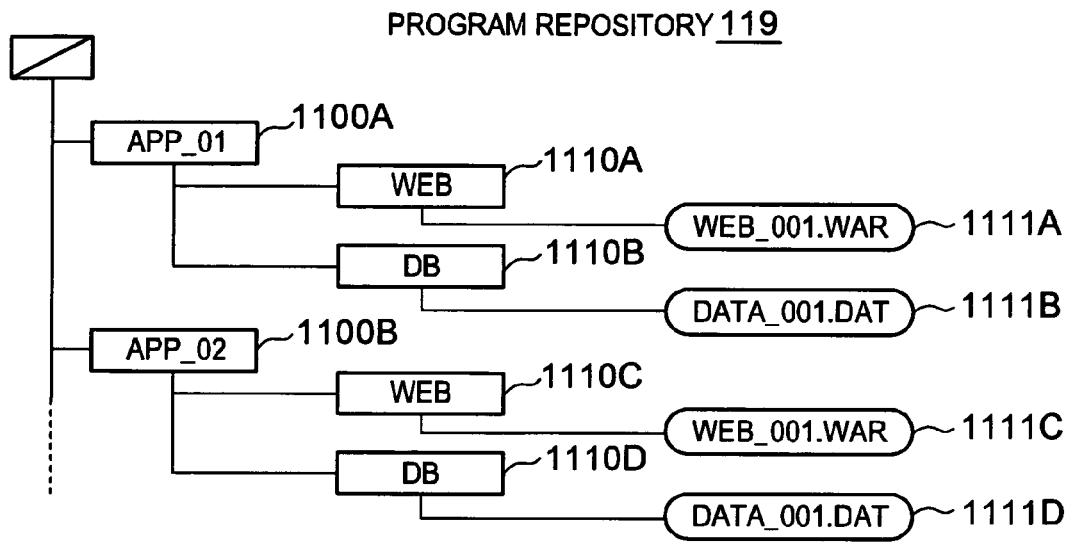
FIG. 12 is a diagram schematically showing a program repository 119.

In the program repository 119, as regards the individual business systems 153, for each server kind, a business application program for executing the computer resource as the server kind is registered. FIG. 12 is a diagram schematically showing the program repository 119. The program repository 119 is constructed, for example, on a file system. As shown in FIG. 12, by a folder 1100A or 1100B storing program files for each business ID, it is possible to classify that the files are used by which business system 153. Further, at the lower level of the folders 1100A and 1100B representing the business IDs, folders 1110A to 1110D for classifying the server kinds are provided. In the individual folders, program files and set data files 1111A to 1111D required for the operations in the servers are stored. According to the program repository 119, the business application program is specified by the combination of the business ID and the server kind.

For example, it can be seen that the program file 'WEB_001WAR' 1111A is stored in the folder 1110A having the server kind 'WEB', which is the subfolder of the folder 1100A having the business ID 'APP_01'.

Next, the individual processing units 121 to 125 provided in the arithmetic unit 1202 will be described.

The metric information collecting unit 121 receives the metric information from each computer resource 1241, which is executing the business application, through the management network 1222, and updates the metric information recording table 114 on the basis of the received metric information.

Specifically, when receiving the metric information from the computer resource 1241, the metric information collecting unit 121 searches the record 521 having the computer ID of the computer resource 1241 from the resource management table 113, and acquires the values of the business ID and the server kind from the record 521. Next, the metric information collecting unit 121 searches the record 221 having the computer ID of the computer resource 1241 from the metric information recording table 114. When the record 221 exists, the metric information collecting unit 121 updates the business ID and the server kind of the record 221 to the acquired values of the business ID and the server kind, and updates the metric information to the metric information received from the computer resource 1241. On the other hand, when the record 221 does not exist, the metric information collecting unit 121 adds the new record 221 to the metric information recording table 114, and registers the computer ID of the computer resource 1241, the acquired values of the business ID and the server kind, and the metric information received from the computer resource 1241 in the added record 221.

The business margin index calculating unit 122 calculates the current processing capacity, the optimum processing capacity, and the margin index for each combination of the business ID and the server kind by using the business system configuration management table 111, the processing capacity table 112, the resource management table 113, and the metric information recording table 114, and updates the business margin index table 115.

The resource adjustment scheduling unit 123 refers to the resource management table 113, and, when an unallocated computer resource 1241 exists, determines the unallocated computer resource 1241 as a computer resource 1241 to be newly allocated. On the other hand, when the unallocated computer resource 1241 does not exist, the resource adjustment scheduling unit 123 determines the computer resource 1241 subject to the allocation change on the basis of the business margin index table 115, the resource adjustment policy table 116, and the resource set/release time recording table 118. And then, the resource adjustment scheduling unit 123 registers the record 721, in which information before and after the allocation change of the determined computer resource 1241, that is, the information regarding the reservation source system and the reservation destination system is described, in the resource adjustment planning table 117.

The configuration change instructing unit 124 instructs the program distributing/setting unit 125 to release (uninstall) and set (install) the business application program, and to reset the load balancer so as to use the computer resource 1241, whose allocation to the business system 153 is changed, according to the resource adjustment planning table 117. When the instruction is successful, the resource management table 113 is updated, and thus the change content is reflected in the resource management table 113.

The program distributing/setting unit 125 accesses the computer resource 1241 through the management network 1222 and instructs the computer resource 1241 to release (uninstall) the business application program according to the instruction from the configuration change instructing unit 124. Further, the program distributing/setting unit 125 extracts the program file and/or the set data file from the program repository 119, transmits the extracted file to the computer resource 1241, and instructs the computer resource 1241 to set (install) the business application program. In addition, the program distributing/setting unit 125 accesses the load balancer 1231 through the management network 1222, and updates information of the computer resource 1241, which executes the business application program registered in the dedication destination management table 1232.

Next, the operation of the arbitration apparatus for resource allocation 101 having the above-described configuration will be described.

Figure 13:
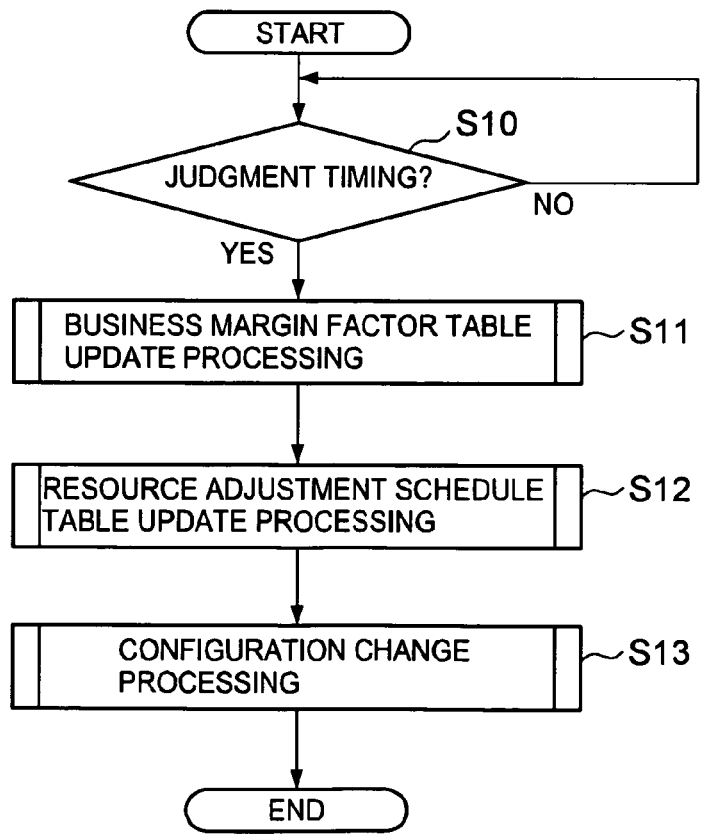
FIG. 13 is a diagram illustrating an operation flow of the arbitration apparatus for resource allocation 101.

FIG. 13 is a diagram illustrating an operation flow of the arbitration apparatus for resource allocation 101. Hereinafter, a flow of a resource allocation arbitration processing will be described with reference to the flowchart. Moreover, though not shown in the flowchart, as described above, the metric information collecting unit 121 constantly performs a processing of receiving the metric information from each computer resource 1241 through the management network 1222, and updating the metric information recording table 114 with the metric information.

By the way, in FIG. 13, when detecting a resource allocation judgment timing, such as the lapse of predetermined time or the arrival of predetermined time, or when receiving a resource allocation arbitration instruction from the user through the administrator terminal 103 by using the timer 131 (YES at a step S10), the arithmetic unit 1202 instructs the business margin index calculating unit 122 to perform a business margin index table update processing.

When receiving this instruction, the business margin index calculating unit 122 performs the business margin index table update processing (Step S11). That is, by using the business system configuration management table 111, the resource management table 113, and the metric information recording table 114, the business margin index calculating unit 122 calculates the current processing capacity, the optimum processing capacity, and the margin index for each combination of the business ID and the server kind. And then, the business margin index calculating unit 122 updates each record 621 of the business margin index table 115 with the current processing capacity, the optimum processing capacity, and the margin index calculated for the business application having the business ID and the server kind registered in the fields 601 and 602 of the record 621.

Figure 14:
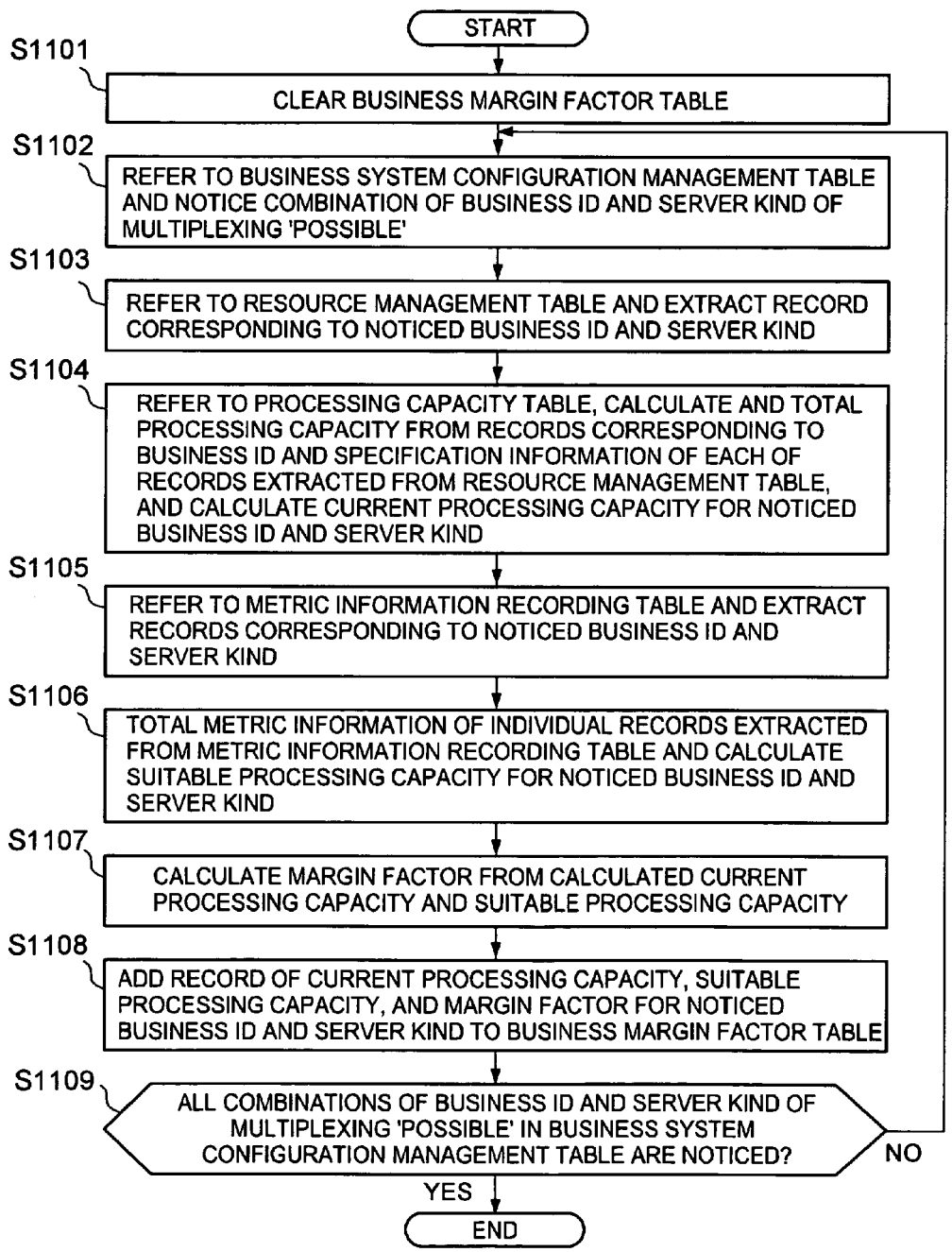
FIG. 14 is a diagram illustrating an operation flow of a step S11 (business margin index table update processing) in FIG. 13.

FIG. 14 is a diagram illustrating an operation flow of the step S11 (business margin index table update processing) in FIG. 13.

First, the business margin index calculating unit 122 clears the registered content of the business margin index table 115 (Step S1101). Next, the business margin index calculating unit 122 specifies an unnoticed record 421, the field 403 of which is registered as multiplexing 'POSSIBLE' from the business system configuration management table 111, and sets the record 421 as a noticed record (Step S1102).

Next, the business margin index calculating unit 122 searches and extracts the records 521 having the business ID and the server kind of the noticed record from the resource management table 113 (Step S1103). For example, in the example shown in FIG. 7, when the business ID of the noticed record is 'APP_01', and the server kind thereof is 'WEB', the record 521 of the computer ID 'M_001' and the record 521 of the computer ID 'M_002' are extracted.

Next, the business margin index calculating unit 122 searches the record 321 having the business ID, the server kind, and the specification information (the CPU name, the CPU frequency, and the memory space) matching with the individual records 521 extracted at the step S1103 by referring to the processing capacity table 112, and acquires the value of the processing capacity from the field 306 of the searched record 321. And then, the business margin index calculating unit 122 calculates the sum of the acquired processing capacity, and temporarily stores that in the memory as the current processing capacity of the business application for the business ID and the server kind of the noticed record (Step S1104). For example, in the example shown in FIG. 7, when the records 521 extracted at the step S1103 are the record 521 of the computer ID 'M_001' and the record 521 of the computer ID 'M_002', the current processing capacity becomes 500+650=1150.

Next, the business margin index calculating unit 122 refers to the metric information recording table 114 and extracts the records 221 which correspond to the business ID and the server kind of the noticed record (Step S1105). For example, in the example shown in FIG. 4, when the business ID of the noticed record is 'APP_01' and the server kind thereof is 'WEB', the record 221 of the computer ID 'M_001' and the record 221 of the computer ID 'M_002' are extracted.

Next, the business margin index calculating unit 122 totals the number of requests for the metric information of the individual records 221 extracted at the step S1105, and temporarily stores the sum in the memory as the optimum processing capacity of the business application for the business ID and the server kind of the noticed record (Step S1106). For example, in the example shown in FIG. 4, when the records 221 extracted at the step S1105 are the record 221 of the computer ID 'M_001' and the record 221 of the computer ID 'M_002', the optimum processing capacity becomes 1000+1350=2350.

Next, the business margin index calculating unit 122 calculates the margin index by using the current processing capacity calculated at the step S1104 and the optimum processing capacity calculated at the step S1106, and temporarily stores that in the memory (Step S1107). For example, the margin index is calculated by 'current processing capacity÷optimum processing capacity×100'. The margin index may be a value represented by a ratio between the processing capacity of the current configuration of the business system and the optimum processing capacity required for the business system to stably process the current request amount. For example, when the business ID of the noticed record is 'APP_01' and the server kind thereof is 'WEB', the current processing capacity obtained from FIG. 7 at 1104 is '1150', and the optimum processing capacity obtained from FIG. 4 at 1106 is '2350'. Therefore, the margin index becomes '1150÷2350×100=48.9'.

Next, the business margin index calculating unit 122 adds the calculation result for the business ID and the server kind of the noticed record (values stored in the memory at the steps S1104, S1106, and S1107) as the record 621 of the business margin index table 115 (Step S1108). For example, when the business ID of the noticed record is 'APP_01' and the server kind thereof is 'WEB', the record 621A shown in FIG. 8 is added to the business margin index table 115.

Next, the business margin index calculating unit 122 confirms whether or not all the records 421 of multiplexing 'POSSIBLE' registered in the business system configuration management table 111 are noticed (Step S1109). When all the records are noticed (YES at the step S1109), the resource adjustment scheduling unit 123 is instructed to execute a resource adjustment planning table update processing, and then the flow ends. On the other hand, if the unnoticed record 421 exists (No at the step S1109), the process returns to the step S1102, the unnoticed record 421 is set as the next noticed record, and then the steps S1102 to S1108 are performed.

Returning to FIG. 13, if the execution of the resource adjustment planning table update processing is instructed from the business margin index calculating unit 122, the resource adjustment scheduling unit 123 executes the resource adjustment planning table update processing (Step S12). That is, the resource adjustment scheduling unit 123 refers to the resource management table 113, and, when an unallocated computer resource 1241 exists, determines that as the computer resource 1241 to be newly allocated. On the other hand, when the unallocated computer resource 1241 does not exist, the resource adjustment scheduling unit 123 determines the computer resource 1241 subject to the allocation change on the basis of the business margin index table 115, the resource adjustment policy table 116, and the resource set/release time recording table 118. And then, the resource adjustment scheduling unit 123 registers, in the resource adjustment planning table 117, the record 721, in which the information before and after the allocation change of the determined computer resource 1241, that is, the information of the reservation source system and the reservation destination system is described.

Figure 15:
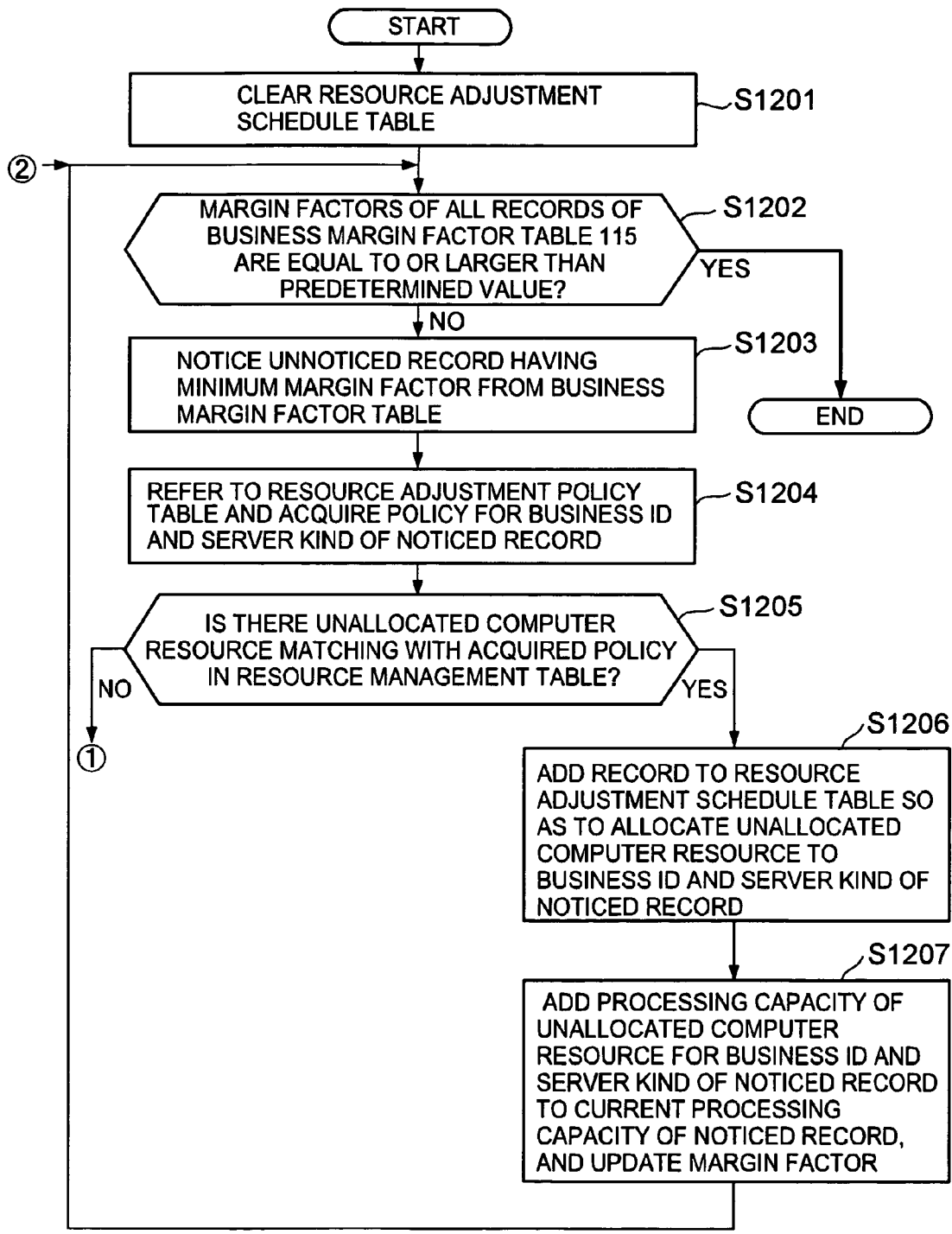
FIG. 15 is a diagram illustrating an operation flow of a step S12 (resource adjustment planning table update processing) in FIG. 13.
Figure 16:
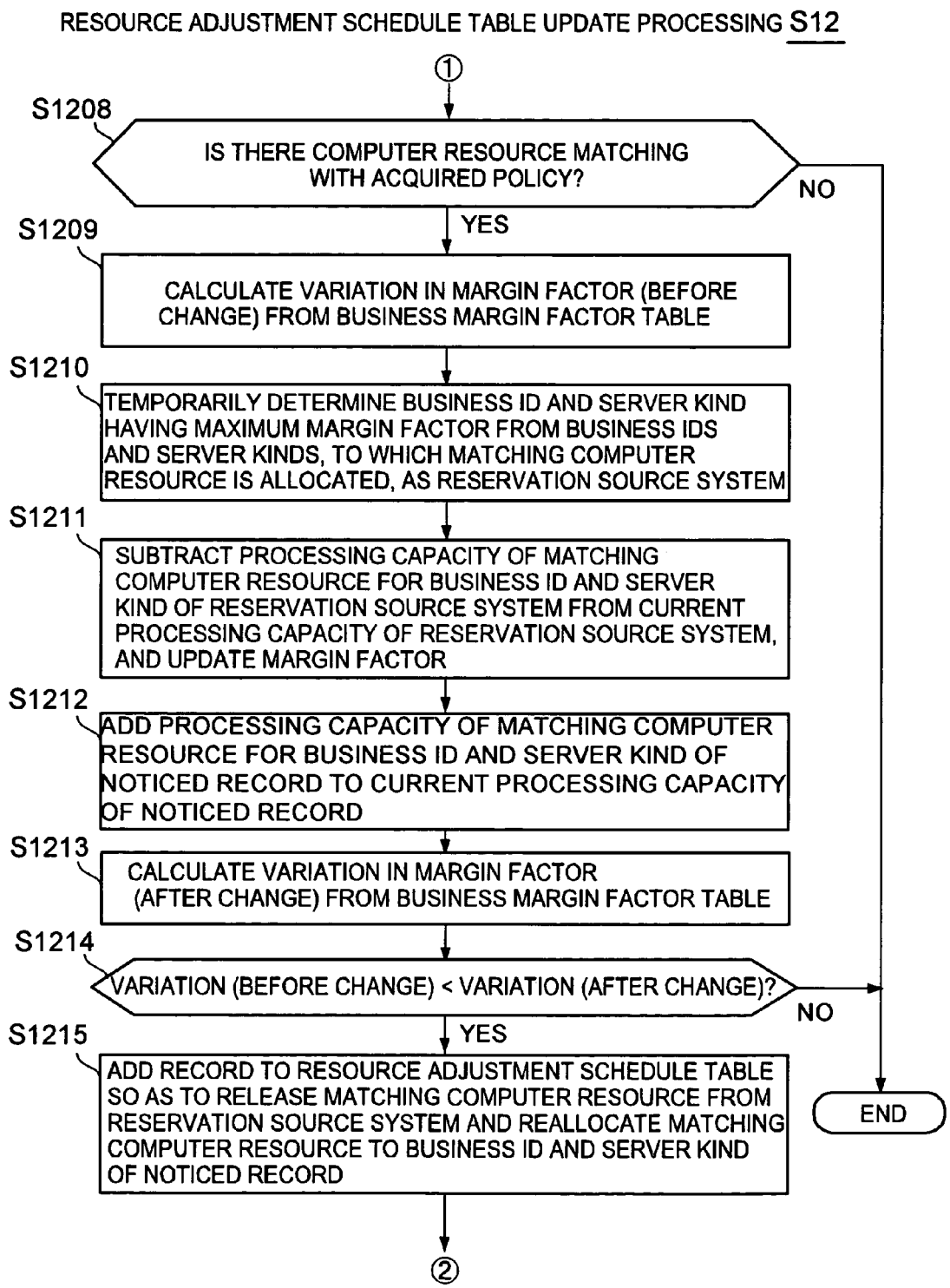
FIG. 16 is a diagram illustrating an operation flow of a step S12 (resource adjustment planning table update processing) in FIG. 13.

FIGS. 15 and 16 are diagrams illustrating an operation flow of the step S12 (resource adjustment planning table update processing) in FIG. 8.

First, the resource adjustment scheduling unit 123 clears the registered content of the resource adjustment planning table 117 (Step S1201). Next, as regards the business margin index table 115, the resource adjustment scheduling unit 123 checks whether or not the margin index of all the records 621 are equal to or more than a predetermined value (for example, 100%) (Step S1202). When the check result at the step S1202 is YES, the resource adjustment scheduling unit 123 instructs the configuration change instructing unit 124 to execute a configuration change processing, and then the flow ends. On the other hand, when the check result is NO, the process progresses to a step S1203.

At the step S1203, the resource adjustment scheduling unit 123 refers to the business margin index table 115, notices an unnoticed record 621 having the minimum margin index, and sets that as a noticed record (Step S1203). For example, in the example shown in FIG. 8, the record 621 of the business ID 'APP_01' and the server kind 'WEB' is set as the noticed record.

Next, the resource adjustment scheduling unit 123 refers to the resource adjustment policy table 116 and searches the records 921 which correspond to the business ID and the server kind of the noticed record. And then, the resource adjustment scheduling unit 123 acquires the policy of each of the searched records 921 (Step S1204). For example, in the example shown in FIG. 10, when the business ID and the server kind of the noticed record are 'APP_01' and 'WEB', the policy that the desired order is '1', the CPU name is 'AAA', the CPU frequency is '866 MHz or more', the memory space is '512 Mbyte or more', and the time condition is '30 minutes' is acquired. Further, when the business ID and the server kind of the noticed record are 'APP_03' and 'WEB', the policy that the desired order is '1', the CPU name is 'AAA', the CPU frequency is '2200 MHz or more', the memory space is '512 Mbyte or more', and the time condition is '40 minutes', and the policy that the desired order is '2', the CPU name is 'AAA', the CPU frequency is '866 MHz or more', the memory space is '512 Mbyte or more', and the time condition is '25 minutes' are acquired.

Next, the resource adjustment scheduling unit 123 searches the record 521, the business ID and the server kind of which are 'UNALLOCATED', from the resource management table 113. Further, the resource adjustment scheduling unit 123 searches the records 1021, which correspond to the specification information of the searched record 521 and correspond to the business ID and the server kind of the noticed record, from the resource set/release time recording table 118. And then, the resource adjustment scheduling unit 123 checks whether or not the record 521, which matches with the policy acquired at the step S1204, from the searched records 521 exists, that is, the specification information of the record 521 and the set time of the record 1021 searched for the record 521 match with the policy acquired at the step S1204 (Step S1205). As a result of the check at the step S1205, when such a record 521 exists, the record 521 is set as a record to be newly allocated. And then, the process progresses to a step S1206. When such a record 521 does not exist, the process progresses to a step S1208.

At the step S1206, the resource adjustment scheduling unit 123 determines such that the computer resource 1241 having the computer ID registered in the field 501 of the record to be newly allocated is allocated to the business application specified by the business ID and the server kind of the noticed record. Here, when a plurality of records to be newly allocated exist, one of the records to be newly allocated which match with the policy having the highest desired order is selected. And then, in order to allocate the determined computer resource 1241 to the business application specified by the business ID and the server kind of the noticed record, the record 721 is added to the resource adjustment planning table 117 (Step S1206).

For example, in the example shown in FIG. 10, when the content of the policy acquired at the step S1204 is that the desired order is '1', the CPU name is 'AAA', the CPU frequency is '666 MHz or more', the memory space is '512 Mbyte or more', and the time condition is '40 minutes', according to the examples shown in FIGS. 7 and 11, the computer resource 1241 having the computer ID 'M_004' has the specification that the CPU name is 'AAA', the CPU frequency is '866 MHz', and the memory space is '1024 Mbyte', and the set time when the computer resource 1241 is applied to the business ID 'APP_01' and the server kind 'WEB' is 'four minutes'. Accordingly, the computer resource 1241 is determined to be allocated to the business application specified by the business ID and the server kind of the noticed record. And then, in the resource adjustment planning table 117, the record 721, in which the computer ID is 'M_004', the business ID and the server kind of the reservation source system are 'UNALLOCATED', and the business ID and the server kind of the reservation destination system are the business ID and the server kind of the noticed record, is registered.

Further, in the field 706 of the record 721, the adjustment date and time (for example, date and time on which the resource adjustment planning table update processing (Step S12) starts) is registered, and, in the field 707 of the record 721, the reflection flag 'UNCOMPLETED' is registered (see the record 721B of FIG. 9).

Next, the resource adjustment scheduling unit 123 acquires the specification information of the computer resource 1241 having the computer ID of the record 721 added to the resource adjustment planning table 117 at the step S1206 from the resource management table 113, and searches the record 321 having the specification information, and the business ID and the server kind of the noticed record from the processing capacity table 112. And then, the resource adjustment scheduling unit 123 adds the processing capacity registered in the field 306 of the searched record 321 to the current processing capacity registered in the field 603 of the noticed record. Simultaneously, the resource adjustment scheduling unit 123 recalculates the margin index, and updates the field 605 of the noticed record (Step S1207).

For example, when the computer resource 1241 having the computer ID 'M_004' is added, according to the example shown in FIG. 7, the specification information of the computer resource 1241 is that the CPU name is 'AAA', the CPU frequency is '866 MHz', and the memory space is '1024 Mbyte'. And then, when the computer resource 1241 having the specification information is allocated to the business ID 'APP_01' and the server kind 'WEB' of the noticed record, the processing capacity is '500 cases/minute' according to the example shown in FIG. 5. This value is added to the current processing capacity registered in the field 603 of the noticed record. As a result, the current processing capacity becomes '1150+500=1650'. Further, the margin index becomes '1650÷2350×100=70.2'. As a result, the business margin index table 115 shown in FIG. 8 is changed from a state indicated by 115A in FIG. 17 to a state indicated by 115B. As such, by allocating the unallocated computer resource 1241 to the business application specified by the business ID 'APP_01' and the server kind 'WEB', the current processing capacity of the business application can be increased, and thus the margin index can be improved (load of the business system can be reduced).

The resource adjustment scheduling unit 123 returns to the step S1202 after executing the step S1207, and continues the processing.

On the other hand, at the step S1208, the resource adjustment scheduling unit 123 searches the records 521, the business ID and the server kind of which are 'UNALLOCATED' or are not the business ID and the server kind of the noticed record, from the resource management table 113. Further, as regards each of the searched records 521, the resource adjustment scheduling unit 123 acquires the release time of the record 1021, which corresponds to the specification information of the record 521 and corresponds to the business ID and the server kind of the record 521, and the set time of the record 1021, which corresponds to the specification information of the record 521 and corresponds to the business ID and the server kind of the noticed record, from the resource set/release time recording table 118. And then, the resource adjustment scheduling unit 123 checks whether or not the record 521 which matches with the policy acquired at the step S1204 exists from the searched records 521, that is, the specification information of the record 521, and the sum of the release time and the set time acquired for the record 521 match with the policy acquired at the step S1204. As a result of the check at the step S1208, when such a record 521 does not exist, the computer resource 1241 to be reallocated does not exist. In this case, the resource adjustment scheduling unit 123 instructs the configuration change instructing unit 124 to execute the configuration change processing, and then the flow ends. On the other hand, when such a record 521 exists, the record 521 is set as a record subject to the allocation change, and the process progresses to a step S1209.

For example, in the example shown in FIG. 10, when the content of the policy acquired at the step S1204 is that the desired order is '1', the CPU name is 'AAA', the CPU frequency is '666 MHz or more', the memory space is '512 Mbyte or more', and the time condition is '40 minutes', according to the examples shown in FIGS. 7 and 11, the computer resource 1241 having the computer ID 'M_051' has the specification that the CPU name is 'AAA', the CPU frequency is '3000 MHz', and the memory space is '1024 Mbyte', the release time required to release the business application under execution (the business ID 'APP_03' and the server kind 'WEB') from the computer resource 1241 is 'eight minutes', and the set time when the computer resource 1241 is applied to the business ID 'APP_01' and the server kind 'WEB' of the noticed record is 'two minutes'. Therefore, the computer resource 1241 having the computer ID 'M_051' matches with the policy acquired at the step S1204. Further, the computer resource 1241 having the computer ID 'M_052' has the specification that the CPU name is 'AAA', the CPU frequency is '2200 MHz', and the memory space is '1024 Mbyte', the release time required to release the business application under execution (the business ID 'APP_02' and the server kind 'WEB') from the computer resource 1241 is 'eight minutes', and the set time when the computer resource 1241 is applied to the business ID 'APP_01' and the server kind 'WEB' of the noticed record is 'three minutes'. Therefore, the computer resource 1241 having the computer ID 'M_052' also matches with the policy acquired at the step S1204. For this reason, the record 521 of the computer resource 1241 having the computer ID 'M_052' and the record 521 of the computer resource 1241 having the computer ID 'M_052' are individually set as the records subject to the allocation change.

Next, at the step S1209, the resource adjustment scheduling unit 123 refers to the business margin index table 115, calculates a variation in margin index, and stores that in the memory. In the example indicated by 115B in FIG. 17, since the values of the margin index are '70.2', '125.0', '200', and '100', for example, the sum of the absolute values of differences of the values from the average value is calculated as the variation. The average value of the four values is '123.8', and the absolute values of the subtraction results of the individual values from the average value are '53.6', '1.2', '76.2', and '23.8', and the sum becomes '154.8' As the calculation method of the variation, other methods may be used.

Next, the resource adjustment scheduling unit 123 temporarily determines the business application having the maximum margin index from the business applications having the business ID and the server kind of the record subject to the allocation change as the reservation source system. And then, the resource adjustment scheduling unit 123 selects one having the business ID and the server kind of the temporarily determined business application of the records subject to the allocation change, and temporarily determines the computer resource 1241 having the computer ID registered in the field 501 of the record subject to the allocation change as the computer resource 1241 to be reallocated to the business application (reservation destination system) specified by the business ID and the server kind of the noticed record (Step S1210).

For example, at the step S1208, when the record 521 having the computer ID 'M_051' and the record 521 having the computer ID 'M_052' are set as the records subject to the allocation change, according to the example indicated by 115B in FIG. 17, since the margin index '200' of the business application (the business ID 'APP_03' and the server kind 'WEB'), to which the computer ID 'M_051' is allocated, is larger than the margin index '125' of the business application (the business ID 'APP_02' and the server kind 'WEB'), to which the computer ID 'M_052' is allocated, the business application, to which the computer ID 'M_051' is allocated, is temporarily determined as the reservation source system. And then, the computer resource 1241 having the computer ID 'M_051' is temporarily determined as the computer resource 1241 which is reallocated to the reservation destination system.

Next, the resource adjustment scheduling unit 123 acquires the specification information of the computer resource 1241 temporarily determined at the step S1210 from the resource management table 113, and searches the record 321 having the specification information, and the business ID and the server kind of the noticed record from the processing capacity table 112. And then, in the business margin index table 115, the resource adjustment scheduling unit 123 subtracts the processing capacity registered in the field 306 of the searched record 321 from the current processing capacity registered in the field 603 of the record 621 of the reservation source system temporarily determined at the step S1210. Simultaneously, the resource adjustment scheduling unit 123 recalculates the margin index, and updates the field 605 of the record 621 of the reservation source system (Step S1211).

For example, when the business ID and the server kind of the noticed record are 'APP_01' and 'WEB', and the computer resource 1241 having the computer ID 'M_051' is temporarily determined as the computer resource 1241 which is reallocated to the business application (reservation destination system) specified by the business ID and the server kind, the processing capacity for the reservation source system having the specification information of the computer resource 1241 (the CPU name 'AAA', the CPU frequency '3000 MHz', and the memory space '1024 Mbyte') is '1800' according to the example shown in FIG. 5. This value is subtracted from the current processing capacity registered in the field 603 of the record 621 of the reservation source system. As a result, the business margin index table 115 is changed from the state indicated by 115B in FIG. 17 to a state indicated by 115C, and the current processing capacity becomes '7800−1800=6000'. Further, the margin index becomes '6000÷5000×100=120.0'.

Further, the resource adjustment scheduling unit 123 acquires the specification information of the computer resource 1241 temporarily determined at the step S1210 from the resource management table 113, and searches the record 321 having the specification information, and the business ID and the server kind of the noticed record from the processing capacity table 112. And then, the resource adjustment scheduling unit 123 adds the processing capacity registered in the field 306 of the searched record 321 to the current processing capacity registered in the field 603 of the noticed record. Simultaneously, the resource adjustment scheduling unit 123 recalculates the margin index, and updates the field 605 of the noticed record (Step S1212).

For example, when the business ID and the server kind of the noticed record are 'APP_01' and 'WEB', and the computer resource 1241 having the computer ID 'M_051' is temporarily determined as the computer resource 1241 which is reallocated to the business application (reservation destination system) specified by the business ID and the server kind, the processing capacity for the reservation destination system of the specification information (the CPU name 'AAA', the CPU frequency '3000 MHz', and the memory space '1024 Mbyte') of the computer resource 1241 is '650' according to the example shown in FIG. 5. This value is added to the current processing capacity registered in the field 603 of the noticed record. As a result, the business margin index table 115 is changed from the state indicated by 115B in FIG. 17 to the state indicated by 115C, and the current processing capacity becomes '1650+650=2300'. Further, the margin index becomes '2300÷2350×100=97.9'.

And then, the resource adjustment scheduling unit 123 refers to the business margin index table 115, calculates the variation in margin index, and stores that in the memory (Step S1213). In the example indicated by 115C in FIG. 17, since the values of the individual margin index are '97.9', '125.0', '120.0', and '100.0', for example, the sum of the absolute values of the differences of the individual values from the average value is calculated as the variation. The average value of the four values is '110.7', and the absolute values of the subtraction results of the individual values from the average value are '12.8', '14.3', '9.3', and '10.7', and the sum becomes '47.1'. As the calculation method of the variation, other methods may be used.

Next, the resource adjustment scheduling unit 123 examines whether or not the variation calculated at the step S1213 (after change) becomes smaller than the variation calculated at the step S1209 (before change) (Step S1214). If the variation calculated at the step S1213 is not smaller than the variation calculated at the step S1209, the resource adjustment scheduling unit 123 instructs the configuration change instructing unit 124 to execute the configuration change processing, and then the flow ends. On the other hand, when the variation calculated at the step S1213 is smaller than the variation calculated at the step S1209, the resource adjustment scheduling unit 123 removes the computer resource 1241 temporarily determined from the reservation source system temporarily determined, and adds the record 721 to be reallocated to the reservation destination system to the resource adjustment planning table 117 (Step S1215).

For example, when the business ID and the server kind of the reservation source system are 'APP_03' and 'WEB', and the computer resource 1241 having the computer ID 'M_051' is temporarily determined, in the resource adjustment planning table 117, the record 721, in which the computer ID is 'M_051', the business ID and the server kind of the reservation source system are 'APP_03' and 'WEB', and the business ID and the server kind of the reservation source system are the business ID and the server kind of the noticed record, is registered. Further, in the field 706 of the record 721, the adjustment date and time (for example, date and time on which the resource adjustment planning table update processing (Step S12) starts) is registered, and, in the field 707 of the record 721, the reflection flag 'UNCOMPLETED' is registered (see the record 721C in FIG. 9).

The resource adjustment scheduling unit 123 returns to the step S1202 after executing the step S1215, and continues the processing.

The steps S1202 to S1215 described above are repeated until the values of the margin index of all the records of the business margin index table 115 becomes equal to or larger than a predetermined value (for example, 100) or until the value calculated at the step S1209 for the variation in margin index of each business system becomes larger than the value calculated at the step S1213. As a result, the resource adjustment schedule is determined such that the computer resources are sufficiently allocated by all the business systems or, even when the computer resources are not sufficiently allocated by all the business systems, the computer resources are allocated with the averaged margin index among the business systems.

Returning to FIG. 13, when the execution of the configuration change processing is instructed from the resource adjustment scheduling unit 123, the configuration change instructing unit 124 executes the configuration change processing (Step S13). That is, according to the resource adjustment planning table 117, the configuration change instructing unit 124 instructs the program distributing/setting unit to uninstall the business application, install the business application (program file) and reset the load balancer. When the instruction is successful, the configuration change instructing unit 124 updates the resource management table 113 so as to reflect the change content in the resource management table 113.

Figure 18:
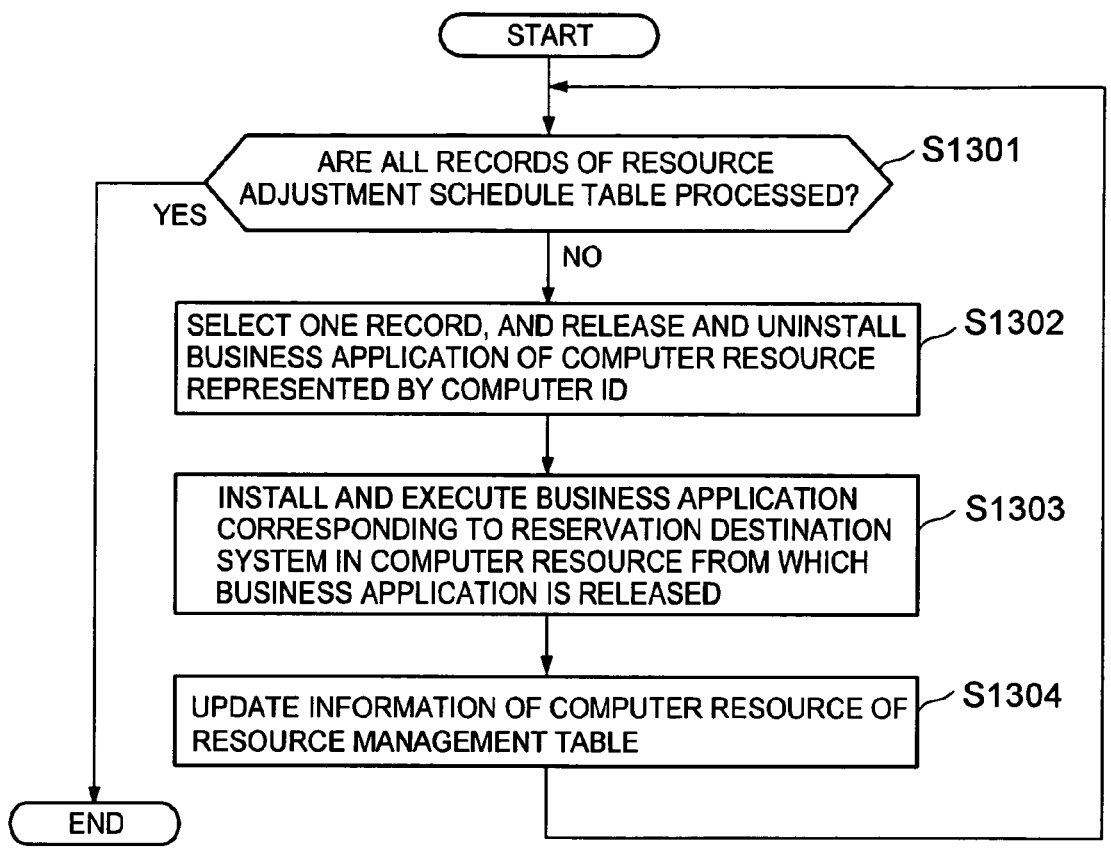
FIG. 18 is a diagram illustrating an operation flow of a step S13 (configuration change processing) in FIG. 14.

FIG. 18 is a diagram illustrating an operation flow of the step S13 (configuration change processing) in FIG. 13.

First, it is checked whether or not all the records 721 of the resource adjustment planning table 117 are processed (the reflection flag of the field 707 is 'COMPLETED') (Step S1301). When an unprocessed record 721 exists, the process progresses to a step S1302. On the other hand, when all the records 721 are processed, the flow ends.

Next, the configuration change instructing unit 124 selects one unprocessed record 721 from the records 721 of the resource adjustment planning table 117, and instructs the program distributing/setting unit 125 to end the business application of the computer resource 1241 represented by the computer ID of the record 721 and uninstall the program (Step S1302). The end processing of the business application differs according to the business applications, but has a processing of deleting the entry of the computer resource 1241 to be processed from the dedication destination table 1232 of the load balancer 1231.

Next, the configuration change instructing unit 124 instructs the program distributing/setting unit 125 to install the program of the business application corresponding to the business ID and the server kind of the reservation destination system in the computer resource 1241, which is unallocated at the step S1302, and to perform a start processing (Step S1303). Required program files are stored in the program repository 119.

Next, the configuration change instructing unit 124 stores the business ID and the server kind of the reservation destination system in the fields 505 and 506 of the record 521 having the computer ID of the computer resource 1241, which changes the business application, in the resource management table 113. Further, the configuration change instructing unit 124 changes the reflection flag registered in the field 707 of the selected record 721 from 'UNCOMPLETED' to 'COMPLETED' (Step S1304). And then, the process returns to the step S1301.

As such, the embodiment of the present invention has been described.

In this embodiment, the arbitration apparatus for resource allocation 101 calculates the margin index of the individual business systems, and readjusts the computer resources 1241 allocated to the individual business systems such that the values of the margin index of all the business systems becomes equal to or larger than the predetermined value, that is, the computer resources 1241 are sufficiently allocated by all the business systems, or such that the computer resources 1241 are allocated with the averaged margin index among the business systems by minimizing the variation in margin index of the individual business systems. Therefore, according to the this embodiment, it is possible to manage the computer resources 1241 allocated to the individual business applications, such that the service level of each of the business applications can be prevented from being lowered.

Moreover, the invention is not limited to the above-described embodiment, and various modifications can be made within the scope of the subject matter of the present invention. For example, in the above-described embodiment, the management network 1222 and the business network 1223 are separately provided, but one network may be used as the management network and the business network.

Further, in the above-described embodiment, the arbitration apparatus for resource allocation 101 distributes the program files to the computer resources 1241. However, the program files may be stored in the computer resources 1241 in advance. In this case, the installer 1253 installs the program files assigned by the arbitration apparatus for resource allocation 101, and then the program files are executed by the module executing unit 1254.

Having described a preferred embodiment of the present invention with reference to the accompanying drawings, it is to be understood that the invention is not limited to the embodiments and that various changes and modifications could be effected therein by one skilled in the art without departing from the spirit or scope of the present invention as defined in the appended claims.

What is claimed is:

1. An arbitration apparatus for modifying allocation of computer resource for executing business application in a system, the arbitration apparatus comprising:

processing capacity storing means which stores an expected processing capacity expected when the business application is executed by computer resources according to individual specification of the computer resources, for each of the business application;

processing amount storing means which stores the processing amount of the business application allocated to each of the computer resources, for each of the computer resources;

margin rate calculating means which calculates the margin rate based on a current processing amount representing sum of processing amount of the business application by each of the computer resources allocated with the business application and an optimum processing amount representing sum of processing capacity for the business application of each of the computer resources allocated with the business application;

adjustment planning means which plans a change of the business application to be allocated to the computer resources based on the margin rate for each of the business applications calculated by the margin rate calculating means; and configuration modifying means which releases the business application allocated to the computer resource according to planned content determined by the adjustment planning means and setting another business application to the computer resource;

wherein the system executes each one of a plurality of business applications by at least one of a plurality of computing resources and directing a request for business application to the computer resource executing the business application, and wherein the margin rate calculating means calculates the optimum processing amount by:

calculating the current processing amount for the business application being specified, for each of the computer resources allocated with the business application, using the processing amount storing means; and adding the processing capacity for the business application being specified, for each of the computer resources, based on respective specification of the computer resources allocated with the business application, using the processing capacity storing means.

2. The arbitration apparatus according to claim 1, wherein the adjustment planning means plans change in the business application allocated to the computer resource such that the margin rate of each of the business applications is equal to or larger than a predetermined value.

3. The arbitration apparatus according to claim 1, wherein the adjustment planning means plans change in the business application allocated to the computer resource such that a variation in the margin rate of each of the business applications is minimized.

4. The arbitration apparatus according to claim 1, further comprising:

resource set/release time storing means which stores time required to release the business application allocated to the computer resource, and time required to set the business application to the computer resource; and resource reallocation time selection condition storing means which stores a selection condition on reallocation time of the computer resource, wherein the adjustment planning means plans change of the business application allocated to the computer resource on the basis of the resource selection condition stored in the resource reallocation time selection condition storing means and the sum of resource set time and resource release time stored in the resource set/release time storing means.

5. The arbitration apparatus according to claim 2, further comprising:

resource set/release time storing means which stores time required to release the business application allocated to the computer resource, and time required to set the business application to the computer resource; and resource reallocation time selection condition storing means which stores a selection condition on reallocation time of the computer resource, wherein the adjustment planning means plans change of the business application allocated to the computer resource on the basis of the resource selection condition stored in the resource reallocation time selection condition storing means and the sum of resource set time and resource release time stored in the resource set/release time storing means.

6. The arbitration apparatus according to claim 3, further comprising:

resource set/release time storing means which stores time required to release the business application allocated to the computer resource, and time required to set the business application to the computer resource; and resource reallocation time selection condition storing means which stores a selection condition on reallocation time of the computer resource, wherein the adjustment planning means plans change of the business application allocated to the computer resource on the basis of the resource selection condition stored in the resource reallocation time selection condition storing means and the sum of resource set time and resource release time stored in the resource set/release time storing means.

7. The arbitration apparatus according to claim 1, further comprising:

resource specification selection condition storing means which stores a selection condition on the specification of the computer resource, wherein the adjustment planning means plans change of the business application allocated to the computer resource on the basis of the resource specification selection condition stored in the resource specification selection condition storing means.

8. The arbitration apparatus according to claim 2, further comprising:

resource specification selection condition storing means which stores a selection condition on the specification of the computer resource, wherein the adjustment planning means plans change of the business application allocated to the computer resource on the basis of the resource specification selection condition stored in the resource specification selection condition storing means.

9. The arbitration apparatus according to claim 3, further comprising:

resource specification selection condition storing means which stores a selection condition on the specification of the computer resource, wherein the adjustment planning means plans change of the business application allocated to the computer resource on the basis of the resource specification selection condition stored in the resource specification selection condition storing means.

10. An arbitration system comprising:
an arbitration apparatus according to claim 1;
a plurality of computer resources; and
a load balancer which directs a request for a business application to a computer resource executing the business application from the plurality of computer resources.

11. An arbitration system comprising:
an arbitration apparatus according to claim 4;
a plurality of computer resources; and
a load balancer which directs a request for a business application to a computer resource executing the business application from the plurality of computer resources.

12. An arbitration system comprising:
an arbitration apparatus according to claim 5;
a plurality of computer resources; and
a load balancer which directs a request for a business application to a computer resource executing the business application from the plurality of computer resources.

* * * * *